Dec. 4, 1923.  
J. EMONTS  
VETERINARY INSTRUMENT  
Filed June 16, 1920
1,476,500
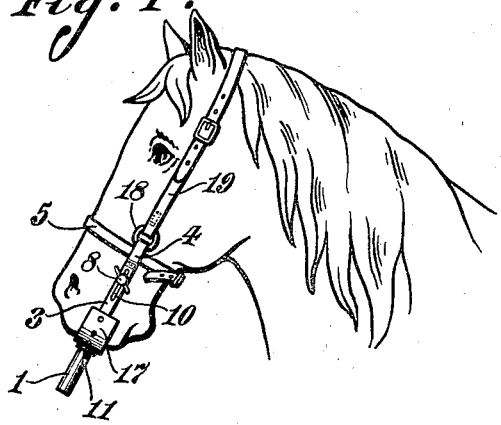
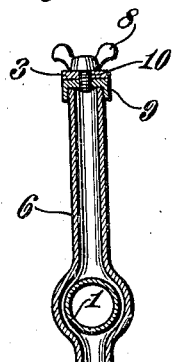
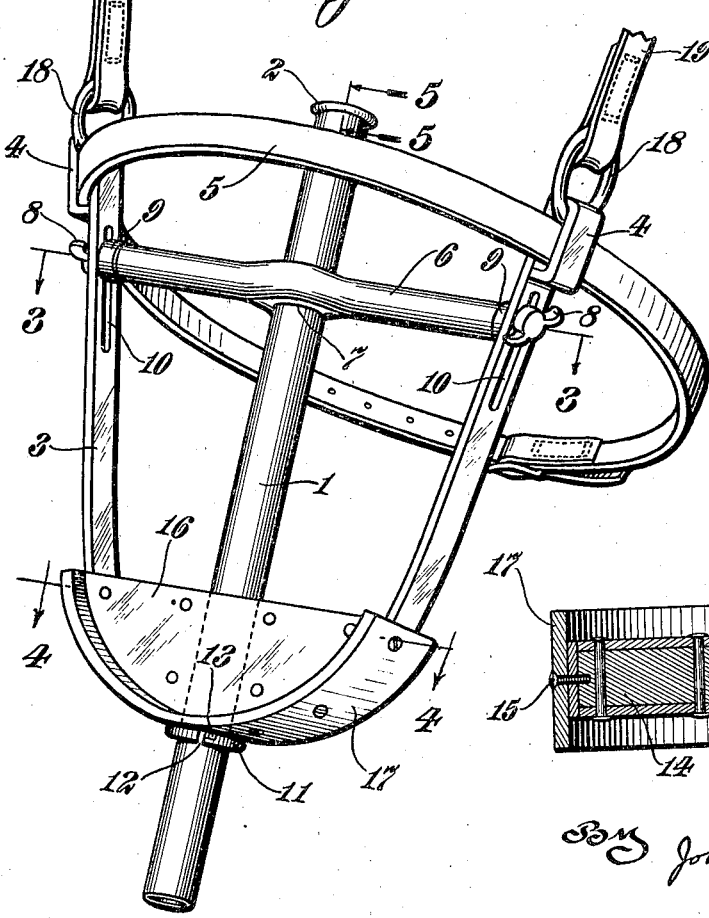
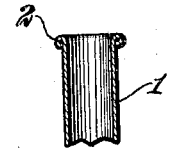
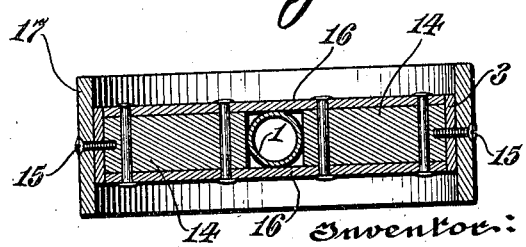
Inventor:  
JOSEPH EMONTS,  
By John H. Bruninga,  
His Attorney.

Patented Dec. 4, 1923.

1,476,500

UNITED STATES PATENT OFFICE.

JOSEPH EMONTS, OF O'FALLON, MISSOURI.

VETERINARY INSTRUMENT.

Application filed June 16, 1920. Serial No. 389,386.

*To all whom it may concern:*

Be it known that I, JOSEPH EMONTS, a citizen of the United States, and residing at O'Fallon, Missouri, have invented the new and useful Improvement in Veterinary Instruments, of which the following is a specification.

This invention relates to veterinary instruments, and more particularly to a device adapted to facilitate the administration of medicine to animals, or the insertion of instruments into the mouth and stomach of an animal.

The difficulty of administering medicine to an animal is well known and a number of devices have been used to assist in such an operation. This difficulty is, however, experienced due to the action, voluntary or involuntary, of the animal's tongue and throat.

One of the objects of this invention, therefore, is to provide an implement for administering medicine to animals which is proof against disturbance by the muscular action of the animal.

Another operation in which difficulty is experienced is that of inserting a stomach tube or probang, due chiefly to the resistance of the animal, and the danger of injury to the instrument by its teeth.

Another object of this invention, therefore, is to provide means adapted to facilitate the insertion of an instrument into the mouth of an animal and to protect such instrument against injury by the animal.

Further objects will appear from the detail description taken in connection with the accompanying drawing, in which:

Figure 1 is a view showing one embodiment of this invention as applied to the animal;

Figure 2 is a perspective view showing an embodiment of this invention;

Figure 3 is a sectional view taken on the line 3—3, Figure 2;

Figure 4 is a section on the line 4—4, Figure 2; and

Figure 5 is a partial section on line 5—5, Figure 2.

Referring now to the accompanying drawing, the instrument consists of a tube 1 preferably of metal, adapted to be inserted into the animal's mouth, and through which medicine or instruments may be inserted. The end of the tube 1, which is inserted in the mouth, has a turned over head 2, to form a rounded surface, so as to avoid injury to the animal.

The tube 1 is supported by a frame comprising a metal strap 3 having substantially a U-shape, the open ends of the U being turned over as shown at 4 to provide a loop having a strap 5 which is adapted to encircle the snout of the animal to hold the frame 3 in place. The loops 4 also provide attachment for rings 18 to which a head-stall 19 may be attached.

Near the open end of the U is a cross brace 6 preferably tubular in shape and having an aperture 7 through which passes the tube 1, and which is attached to a strap 3 on each side by means of a thumb screw 8 which is tapped into a cap 9 fitted on each end of said brace. The strap 3 is slotted as shown at 10 to allow for adjustment of the position of the brace 6.

The strap 3 is provided at the bottom of the U with an aperture to permit passage of the tube 1, and is fitted with a collar 11 having a bayonet-joint slot 12 adapted to engage a pin 13 on the tube 1, so as to lock said tube in place. Attached to the strap 3 on the interior, are two blocks 14, preferably of aluminum or similar material, which are attached to the strap 3 by means of screws 15 and are held in place by cover plates 16 on the top and bottom to which the blocks 14 are riveted. Sufficient space is allowed between the blocks 14 to allow passage of the tube 1.

The closed end of the U-shaped frame may be covered with a broad strip of leather or similar material 17, so as to protect the mouth of the animal.

In using the device, it is inserted in the animal's mouth, the tube 1 being placed in a proper position over the tongue, the frame 3 encircling the mouth on the outside, the teeth resting on the cover plates 16 and the brace 6 being adjusted to engage the bars of the mouth. The strap 5 is then buckled about the snout and the head stall 19 adjusted in place. The device is then ready for use. By raising the head and inserting a suitable funnel in the end of the tube 1, medicine may be poured down said tube and will be delivered at such a point in the throat that it must be swallowed immediately. An instrument such as a stomach tube or probang may be inserted without danger of its being dislodged or damaged by the animal, the tube 1 and the brace 6 serving to confine the tongue or limit the movement thereof, and the plates 16 and the blocks 14 serving to support the pressure of the teeth.

It will be seen, therefore, that this invention accomplishes its objects. The tube 1 is inserted in such a position that the easy and successful administration of a dose of medicine is insured and said tube also serves as complete protection to any instrument which may be inserted in the mouth.

The instrument makes it possible to use a stomach tube having a thin wall which is flexible, thereby making it easy for an animal to take the tube into the esophagus as in the natural act of swallowing, thus avoiding the distress to the animal when the tube is passed. It also permits use of a tube of larger lumen without increasing the external circumference, avoids injury to the throat often caused by the stiff tubes commonly used, and entirely eliminates the need of a stylet with the tube.

It is obvious that various changes may be made in the details of construction without departing from the spirit of this invention; it is, therefore, to be noted that this invention is not to be limited to the specific details shown and described.

Having thus described this invention, what is claimed is:

1. A veterinary device, comprising, a frame, means for mounting said frame on the head of the animal, and an elongated instrument guiding tube mounted in said frame and positioned thereby within and along the mouth, said tube being constructed and arranged to receive and guide an instrument.

2. A veterinary device, comprising, a frame, means for mounting said frame on the head of the animal, and an elongated tube mounted at spaced points on said frame and positioned thereby within and along the mouth.

3. A veterinary device, comprising, a frame adapted for mounting on the head of the animal, a block on said frame adapted to receive the front teeth, and means on said frame adapted to permit the introduction of an instrument or medicine into the mouth.

4. A veterinary device, comprising, a frame adapted for mounting on the head of the animal, a brace mounted for adjustment on said frame, and means on said frame adapted to permit the introduction of an instrument or medicine into the mouth.

5. A veterinary device, comprising, a frame adapted for mounting on the head of the animal, a brace on said frame, and an elongated tube supported at spaced points by said frame and the brace thereon adapted to position said tube in the mouth.

6. A veterinary device, comprising, a frame adapted for mounting on the head of the animal, a block on said frame adapted to receive the front teeth, a brace on said frame, and a tube supported by said block and said brace.

7. A veterinary device, comprising, a tube adapted to protect an instrument to be inserted into the mouth of an animal, a frame adapted to hold said tube in place, having means adapted to support the pressure of the animal's teeth, and means engaging the bars of the mouth adapted to position said tube.

8. A veterinary drenching horn, comprising, a tube adapted to be inserted in the animal's mouth, and a frame adapted to position said tube, having means for supporting the pressure of the animal's teeth and a brace engaging the bars of the animal's mouth.

In testimony whereof I affix my signature this 30th day of April, 1920.

JOSEPH EMONTS.